United States Patent [19]

Littlehorn, Jr.

[11] 4,275,633
[45] Jun. 30, 1981

[54] APPARATUS FOR PRODUCING LEADED GLASS ARTICLES

[76] Inventor: John J. Littlehorn, Jr., 4530 S. Broadway, Englewood, Colo. 80110

[21] Appl. No.: 969,081

[22] Filed: Dec. 13, 1978

[51] Int. Cl.$^3$ .............................................. B26D 3/08
[52] U.S. Cl. .......................................... 83/886; 83/520
[58] Field of Search ................... 83/886, 520, 565; 33/24 C, 18 R, 25 C; 362/33

[56] References Cited

U.S. PATENT DOCUMENTS

| | | | |
|---|---|---|---|
| 245,149 | 8/1881 | Fowler | 83/565 |
| 868,656 | 10/1907 | Gramelspacher | 83/886 |
| 1,622,053 | 3/1927 | Rounds | 83/520 X |
| 1,775,813 | 9/1930 | Colby | 33/24 C |
| 2,314,327 | 3/1943 | Drake | 83/886 |
| 3,704,067 | 11/1972 | Womack | 83/520 X |
| 3,771,402 | 11/1973 | Bernler | 83/520 X |
| 3,968,711 | 7/1976 | Wilson | 83/565 X |
| 4,038,124 | 7/1977 | Griswold et al. | 83/520 X |
| 4,116,097 | 9/1978 | Graham et al. | 83/520 X |

*Primary Examiner*—Frank T. Yost
*Attorney, Agent, or Firm*—Ralph F. Crandell

[57] ABSTRACT

An Apparatus for producing leaded glass articles by cutting a sheet of glass to desired shapes and joining the cut shapes with lead came cut to the desired length. The sheet glass and lead came cutting apparatus includes a light box for placement of glass to be cut, a cutting device formed by a horizontally traversing multi-pivoting arm assembly for cutting the glass, and pliers-like nippers having flat angled cutting jaws for cutting lead came. A pattern representing the desired glass shape is prepared and affixed to a piece of sheet glass which is then placed upon the upper surface of the light box. The desired shape of glass, as represented by the outline of the pattern, is then cut by positioning the horizontally traversing multi-pivoting arm assembly over the surface of the light box, upon which rests the sheet glass. The cutting means is placed in contact with the sheet glass and is moved over the surface of the sheet glass along the outline of the pattern. Cut glass shapes are joined by pieces of lead came which are cut to appropriate lengths by the pliers-like nippers. A variety of intricate shapes may be cut and joined by utilizing the sheet glass and lead came cutting apparatus.

4 Claims, 2 Drawing Figures

APPARATUS FOR PRODUCING LEADED GLASS ARTICLES

BACKGROUND OF THE INVENTION

1. Field of the Invention

This invention relates to an apparatus for cutting sheet glass and joining the cut shapes with lead came. More particularly, the invention relates to a simple apparatus for cutting sheet glass and lead came which is used in conjunction with a pattern or other configuration representing the desired shape. The invention is of particular utility when it is recognized that accurate cutting of sheet glass and lead came requires a relatively stable sheet glass cutting apparatus which can be easily maneuvered and operated as well as a sharp edged lead came cutting device.

2. Description of Prior Art

Various methods and apparatus for cutting sheet glass and lead came are known in the prior art. Generally, such methods and apparatus involve the use of sheet glass cutting devices independent of any stablilizing means and a single edged lead came cutting device. However, such sheet glass cutting devices ar usually operated by one hand of the user which oftentimes results in inaccurate cutting of the sheet glass to the desired shapes arising from the absence of a stabilizing means associated with the sheet glass cutting device. Use of a single-edged lead came cutting device requires a relatively large amount of force to cut lead came, which often deforms or damages the lead came. Other limitiations and disadvantages of prior art may be more readily apparent and appreciated in light of the improvements and teachings of the present invention.

SUMMARY OF THE INVENTION

The general objective of this invention is to provide a new and improved sheet glass and lead came cutting appatatus for producing leaded glass articles. A related object of the invention is to offer an apparatus for accurately cutting sheet glass and lead came to desired shapes and sizes.

A further object of the invention is to provide a sheet glass and lead came cutting apparatus which is easily operable and relatively simple to utilize.

According to its objectives and general aspects, the sheet glass and lead came cutting apparatus embodying the present invention generally comprise a flat cutting surface in the nature of a rectangular shaped light box with a translucent horizontal upper surface, a horizontally traversing multi-pivoting arm assembly including a cutting means incorporated in an adjustably threaded stylus, a clamp means, and an improved pliers-like nipper.

The light box includes a light transmitting source, which is positioned immediately below and extends the length of the translucent upper surface of the light box.

The horizontally traversing multi-pivoting arm assembly is adapted for attachment to the upper surface of the light box by a clamp means. The horizontally traversing multi-pivoting arm assembly features a replaceable cutting means which is positioned at the lower end portion of an adjustable, threaded stylus. The uppermost portion of the stylus is cooperatively associated with bar components of the horizontally traversing multi-pivoting arm assembly. The stylus may be adjusted in a direction upwardly or downwardly along its axis and perpendicular to the direction of the horizontally traversing multi-pivoting arm assembly, to accomodate differing dimensions of depth of sheet glass. An adjustable wing-like handle is attached to and travels upon the stylus. The wing-like handle is utilized to control and determine the horizontal direction in which the stylus moves upon the surface of the sheet glass.

A pliers-like nipper having an improved cutting edge configuration is utilized to cut lead came to appropriate lengths which are thereafter used to join the cut shapes of glass to form leaded glass articles.

A more complete understanding of the invention and its manner of achieving the objectives can be obtained from the following description of a presently preferred embodiment of the invention taken in conjunction with a drawing consisting of a number of figures and from the appended claims.

DESCRIPTION OF THE PREFERRED EMBODIMENT

Figure 1:
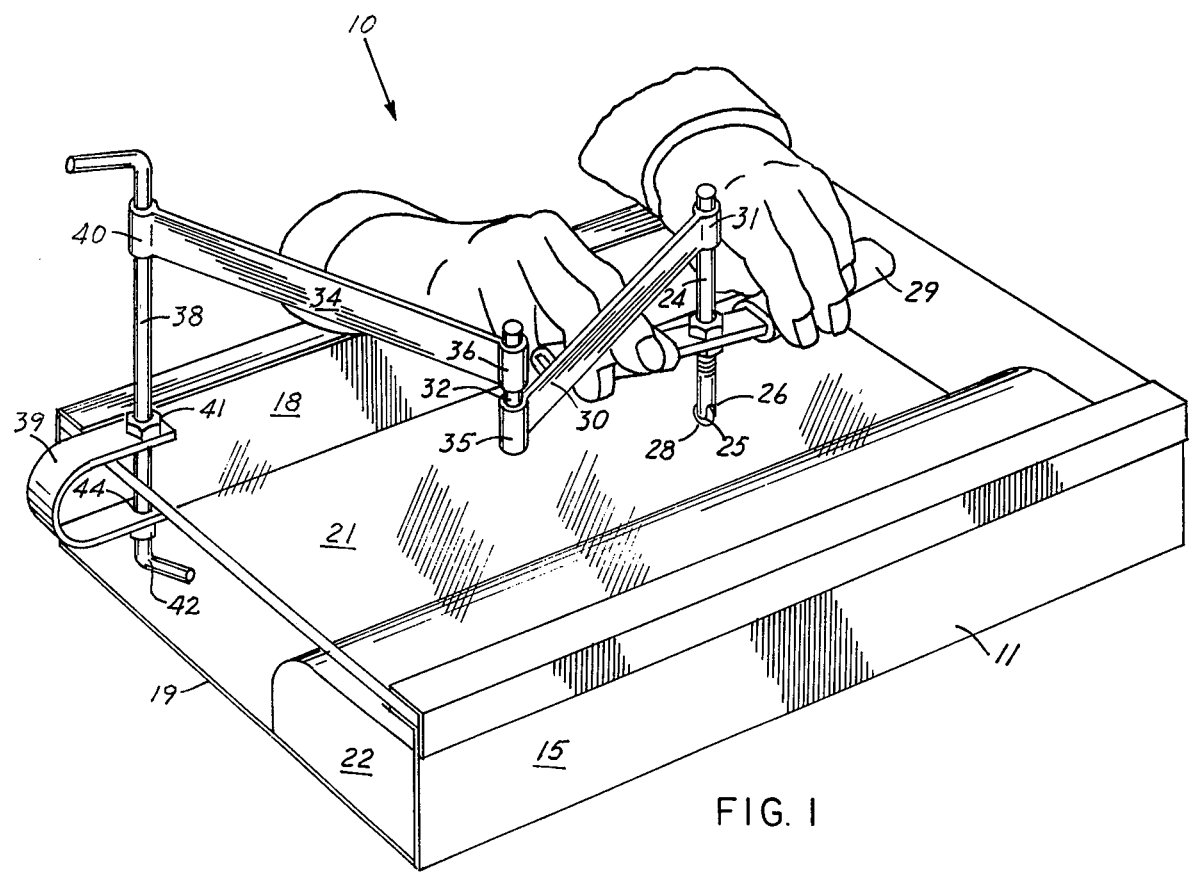
FIG. 1 is a perspective view of the sheet glass cutting apparatus.
Figure 2:
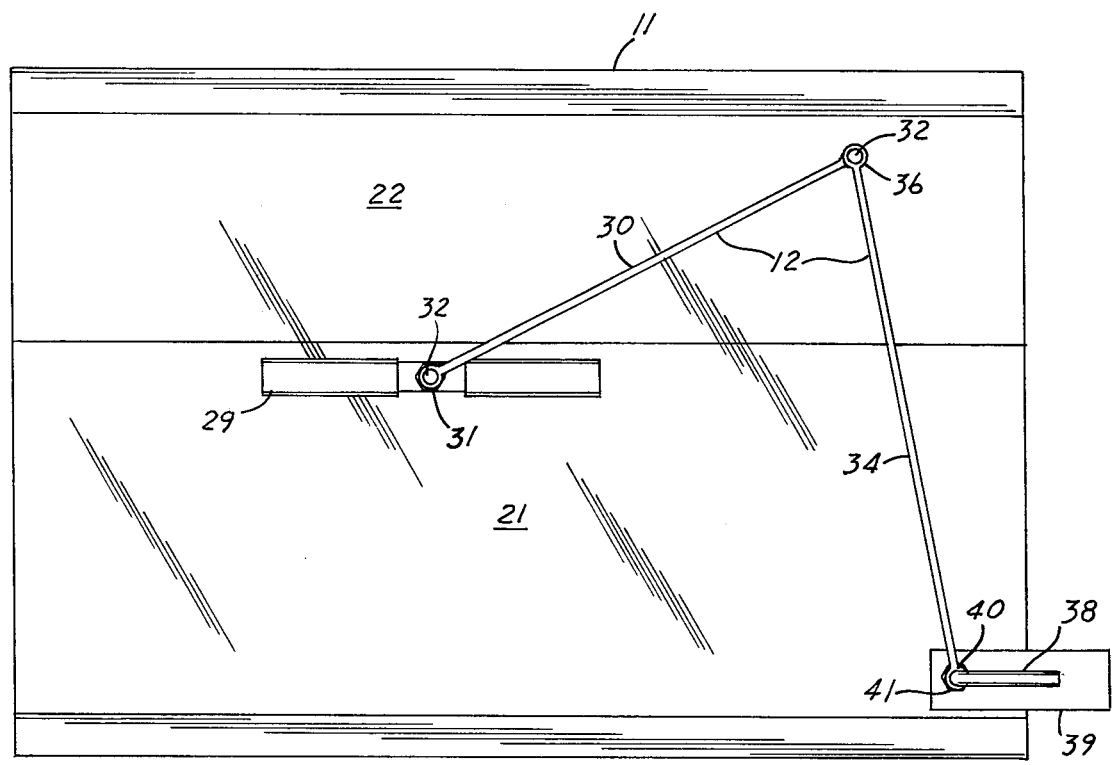
FIG. 2 is a a top plane view of the sheet glass cutting apparatus.
Figure 3:
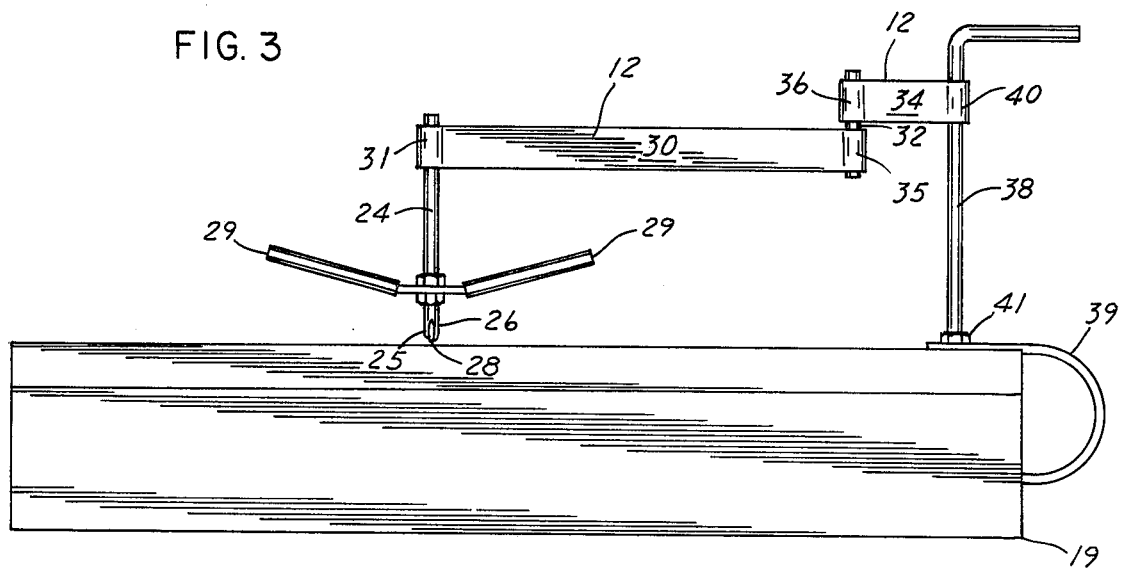
FIG. 3 is a front elevational view of the sheet glass cutting apparatus.
Figure 4:
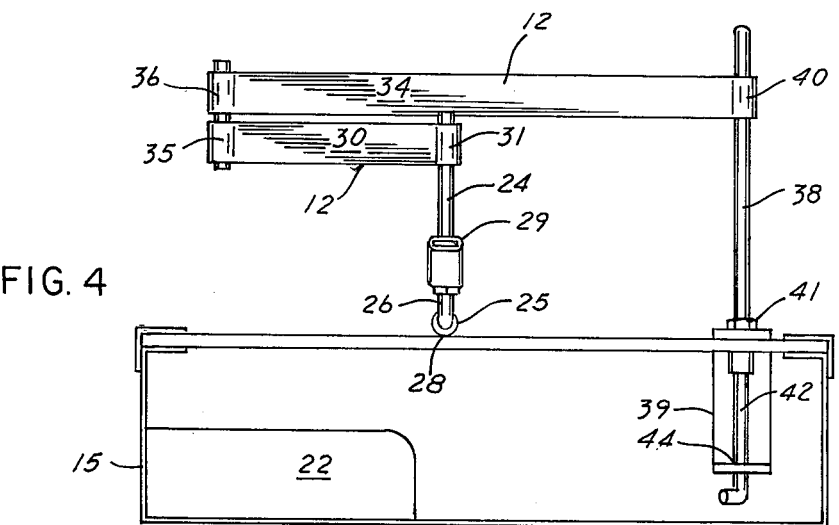
FIG. 4 is a side elevational view of the sheet glass cutting apparatus.
Figure 5:
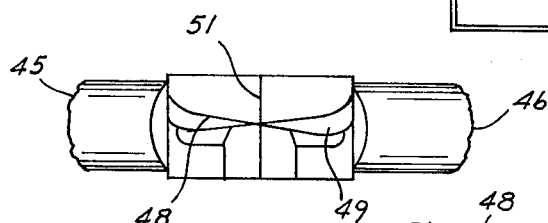
FIG. 5 is a top plane view of the pliers-like nipper.
Figure 6:
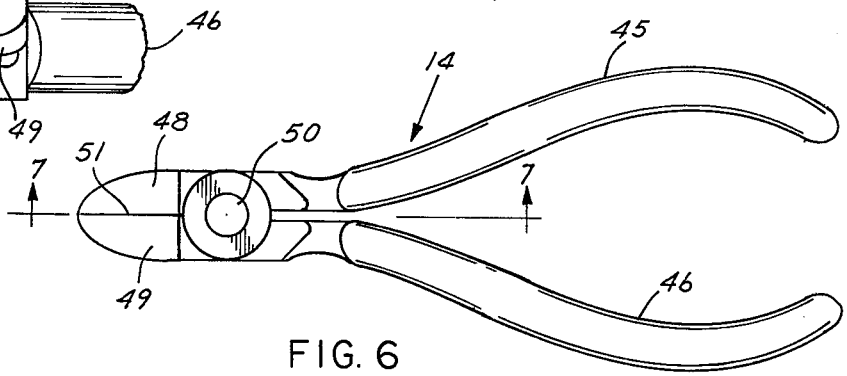
FIG. 6 is a left-hand elevational view of the pliers-like nipper as shown in FIG. 5.
Figure 7:
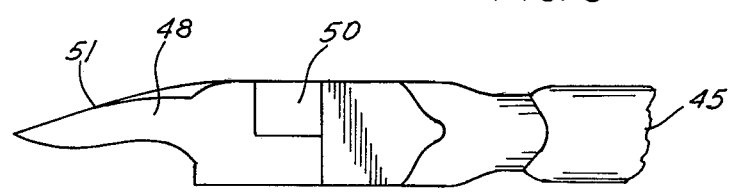
FIG. 7 is a side section view of the pliers-like nipper taken substantially in the plane of line 7—7 on FIG. 5.

A sheet glass cutting apparatus 10 is shown in FIGS. 1 through 4, and comprises a light box 11 and a horizontally traversing multi-pivoting arm assembly 12 which are utilized in association with a pliers-like nipper 14, as shown in FIGS. 5 through 7, to cut the desired shapes of sheet glass and join them with lengths of lead came to form leaded glass articles.

The light box 11 is rectangularly shaped and consists of two side walls 15 and 18 as well as a lower surface 19 and a translucent upper planar surface 21. The light box includes a light transmitting source 22 positioned between surfaces 19 and 21 extending the length of the side wall 15. The translucent upper surface 21 of the light box functions as a cutting surface for sheet glass and allows the passage of light from the light transmitting source through the sheet glass being cut. The transmission of light through sheet glass to be cut highlights the outline of the desired pattern and thereby facilitates the cutting of the sheet glass to the desired shape.

The horizontally traversing multi-pivoting arm assembly 12 includes an adjustable threaded stylus 24 which incorporates a replaceable cutter means 25 such as a hardened cutting wheel, positioned in a vertically directed downwardly opening slot 26 located at the lower end portion of the stylus 24. The replaceable cutter 25 revolves around a removable and reinsertable pin or axle 28 which spans the slot 26 in a direction perpendicular to the axis of the stylus. Rotation of the cutter 25 upon the axle, as it moves upon and is in contact with the surface of sheet glass results in an incision along the line the cutting means travels and effectively cuts the sheet glass. The axle 28 may be removed and reinserted for purposes of replacing the cutter 25 at such time as it no longer functions efficiently.

A wing-like handle 29 is cooperatively associated with and travels upon the threaded stylus and radially extends from the stylus in a direction perpendicular to the axis of the stylus. The handle is utilized to control and determine the horizontal direction in which the stylus and arm assembly travels over the surface of the sheet glass. Downward pressure on the handle 29 causes the cutter 25 to cut into and score the glass, which can then be broken away to leave the cut object. The handle is adjustable upwardly or downwardly on the stylus by rotating it in a clockwise or counter clockwise direction. The extent of upward or downward movement is directly proportional to the number of complete revolutions made by the handle on the stylus. The handle facilitates maneuverability, accuracy and stability in cutting sheet glass to desired shapes by offering two integrally related points of operation.

The uppermost portion of the stylus 24 is cooperatively connected to a bar component 30 of the arm assembly at an angle perpendicular to a threaded connecting means 31 which forms a part of and is located at one end of bar component 30. The stylus may be adjusted in an upward or downward direction along its axis to accomodate differing dimensions of depth of sheet glass. Upward or downward adjustment of the stylus is accomplished by rotating the stylus in a clockwise or counterclockwise direction. The extent of upward or downward movement is directly proportional to the number of complete revolutions made by the stylus.

Bar component 30 is operatively connected by a threaded pin 32 to a second and substantially identical bar component 34 of the arm assembly. The uppermost and bottommost portions of the threaded pin 32 are received by corresponding connecting means 35 and 36 which form a part of and are located at the ends of bar components 30 and 34, respectively. Threaded pin 32 functions as a pivot allowing the bar component 30 to freely turn up to 360° on the bar component 34.

The bar component 34 is cooperatively connected to a threaded pin 38 which joins the bar component 34 with a U-shaped clamp 39. The threaded pin 38 is approximately three times the length of threaded pin 32 and at least 1.25 times the length of the stylus 24. The uppermost portion of the threaded pin 38 is received by a corresponding threaded connecting means 40 which forms a part of and is located at one end of bar component 34. The bottommost portion of the threaded pin 38 is received by a corresponding connecting means 41 which forms a part of and is located on the upper surface of the clamp 39. The threaded pin 38 functions as a pivot allowing the bar component 34 to freely turn up to 360° on the clamp 39.

A threaded pin 42 is operatively connected to the bottommost portion of the clamp 39 through a corresponding threaded hole 44 which is found on the lower surface of the clamp. The clockwise or counterclockwise rotation of threaded pin 42 results in the clamping or releasing of the arm assembly to or from the light box 11.

Desired shapes of sheet glass are joined by utilizing lead came which is cut to appropriate lengths utilizing the pliers-like nipper 14 as shown in FIGS. 5 through 7.

The cutting nipper is comprised to two handles 45 and 46 as well as two cutting jaws 48 and 49 working on a pivot 50. Each cutting jaw is flat angled and tapered and gradually diminishes in thickness toward the cutting edge 51 which extends the length of the cutting jaw. The cutting jaws are operated by grasping the handles 45 and 46 and simultaneously exerting force on each handle in a direct toward or opposite each other for purposes of closing or opening the cutting jaws. When the cutting jaws are opened, lead came is inserted between the cutting edge 51 and cut by simultaneously grasping the handles 45 and 46 and compressing them toward each other.

Utilization of the invention to cut sheet glass to desired shapes is accomplished by placing sheet glass, having length and width dimensions no greater than the length and width dimensions of upper surface, 21 on upper surface 21 of the light box. The arm assembly 12 is then attached to the upper surface 21, of the light box, by use of the clamp 39 and positioned immediately above the sheet glass. The cutter 25 is placed in direct contact with the sheet glass. The sheet glass is cut by sufficient downward pressure exerted on the wing-like handle 29 which is transmitted through the stylus 24 to the cutter 25 as it moves upon the surface of the sheet glass along a line representing the desired shape. The direction in which the arm assembly moves is determined by the force exerted on the handle 29. Movement of the arm assembly is occasioned by grasping the handle 29 and exerting force, in a forward or reverse direction, parallel to the plane of the upper surface of the sheet glass.

Desired shapes of cut glass are joined by inserting the cut glass in grooves of the lead came. The sheet glass and lead came cutting apparatus is suitable for use by individuals possessing no or limited skill in the art of cutting glass, as well as individuals who cut glass on a regular and continuing basis. This apparatus is relatively simple to operate and, in view of the limited number of moving parts, is substantially trouble free from a mechanical operation standpoint.

Although the present invention has been described with a certain degree of particularity, it is understood that the present disclosure has been made by way of example and that changes in details of structure may be made without departing from the spirit of the invention.

I claim as my invention:

1. Apparatus for cutting sheet glass to desired shapes for producing leaded glass articles, said apparatus comprising: a horizontally traversing arm assembly comprised of two substantially identical bar components operatively connected to each other; a clamp cooperatively connected to one bar component of the arm assembly; a stylus cooperatively connected to the other bar component of the arm assembly; a replaceable cutter on the lower end of said stylus; and a wing-like handle mounted on said stylus, said wing-like handle extending laterally away from said stylus and parallel to sheet glass being cut by said cutter, whereby a user can balance the stylus with the wing-like handle so that forces on the cutter can be maximized along the axis of the stylus.

2. Apparatus for cutting sheet glass to desired shapes for producing leaded glass articles, said apparatus comprising: a horizontally traversing arm assembly comprised of two substantially identical bar components operatively connected to each other; a rectangular shaped light box disposed vertically adjacent and below said arm assembly, said light box including a light transmitting source, said light box further including a translucent upper planar surface; a clamp cooperatively interconnecting one bar component of the arm assembly to said translucent upper planar surface of said light box; a stylus cooperatively connected to the other bar component of the arm assembly; a replaceable cutter on the lower end of said stylus; and a wing-like handle mounted on said stylus, said wing-like handle extending laterally away from said stylus and parallel to sheet glass being cut by said cutter, whereby a user can balance the stylus with the wing-like handle so that forces on the cutter can be maximized along the axis of the stylus.

3. Apparatus for cutting sheet glass to desired shapes producing leaded glass articles, said apparatus comprising:

a horizontally traversing arm assembly comprised of two substantially identical bar components operatively connected to each other;

means for mounting one bar component of the arm assembly;

means for cutting sheet glass cooperatively connected to the other bar component of the arm assembly; and a wing-like handle mounted on said means for cutting sheet glass, said wing-like handle extending laterally away from said means for cutting sheet glass and parallel to the sheet glass being cut.

4. The invention as defined in claim 3 further including a light box to which said means for mounting said one bar component of said arm assembly is mounted.

* * * * *